United States Patent
Cooper et al.

(10) Patent No.: US 7,424,150 B2
(45) Date of Patent: Sep. 9, 2008

(54) SYSTEMS AND METHODS FOR MEDIA SUMMARIZATION

(75) Inventors: Matthew L. Cooper, San Francisco, CA (US); Jonathan T. Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 989 days.

(21) Appl. No.: 10/728,777

(22) Filed: Dec. 8, 2003

(65) Prior Publication Data

US 2005/0123053 A1     Jun. 9, 2005

(51) Int. Cl.
*G06K 9/34* (2006.01)

(52) U.S. Cl. ...................................... 382/173
(58) Field of Classification Search ................ 382/173, 382/209, 224, 305, 190; 707/100
See application file for complete search history.

(56) References Cited

U.S. PATENT DOCUMENTS

| | | | | |
|---|---|---|---|---|
| 6,782,394 | B1 * | 8/2004 | Landeck et al. | 707/104.1 |
| 7,151,852 | B2 * | 12/2006 | Gong et al. | 382/173 |
| 2003/0048946 | A1 | 3/2003 | Foote et al. | |
| 2003/0161396 | A1 | 8/2003 | Foote et al. | |
| 2006/0065102 | A1 * | 3/2006 | Xu | 84/600 |
| 2006/0210157 | A1 * | 9/2006 | Agnihotri et al. | 382/173 |

OTHER PUBLICATIONS

Girgensohn et al., "Video Classification using Transform Coefficients," *Proc ICASSP '99*, vol. 6, pp. 3045-3048, Phoenix, AZ, IEEE, 1999.
Lee et al., "Learning the Parts of Objects by Non-negative Matrix Factorization," *Nature*, vol. 401, pp. 788-791, Oct. 1999.
T. Hofmann, "Unsupervised Learning by Probabilistic Latent Semantic Analysis," *Machine Learning*, vol. 42, pp. 177-196, 2001.
T. Hofmann, "The Cluster-Abstraction Model: Unsupervised Learning of Topic Hierarchies from Text Data," *Proceedings of UCAI '99*, 1999.
M. Berry et al., "Using Linear Algebra for Intelligent Information Retrieval," *SIAM Review*, vol. 37, No. 4, pp. 1-24, Dec. 1994.
Zhang et al., "Video Parsing, Retrieval and Browsing: An Integrated and Content-Based Solution," *ACM Multimedia 95, Electronic Proceedings*, Nov. 5-9, 1995, San Francisco, California.

\* cited by examiner

*Primary Examiner*—Daniel Mariam
(74) *Attorney, Agent, or Firm*—Sughrue Mion PLLC

(57) ABSTRACT

A stream of ordered information, such as, for example, audio, video and/or text data, can be windowed and parameterized. A similarity between the parameterized and windowed stream of ordered information can be determined, and a probabilistic decomposition or probabilistic matrix factorization, such as non-negative matrix factorization, can be applied to the similarity matrix. The component matrices resulting from the decomposition indicate major components or segments of the ordered information. Excerpts can then be extracted from the stream of ordered information based on the component matrices to generate a summary of the stream of ordered information.

48 Claims, 8 Drawing Sheets

SYSTEMS AND METHODS FOR MEDIA SUMMARIZATION

BACKGROUND OF THE INVENTION

1. Field of Invention

This invention relates to systems and methods for generating summaries of media stream that are representative of the structural character of the entire steam.

2. Description of Related Art

Media summarization technologies have numerous applications in e-commerce and information retrieval. Many such applications use summaries and/or proxies of longer works, because of the large file sizes and high bandwidth requirements of multi media data. The summary of the media work is reduced in some manner, typically by excerpting a segment or segments that are a good representation of the longer work. To identify segments that are a good representation of the longer work, the structure of the media stream must be determined.

U.S. Published patent application 2003/0048946, which is incorporated herein by reference in its entirety, discloses a method for assessing structure in media streams that includes three steps. In a first step, each window, which is either a single frame, or a short time unit, of the media stream, is parameterized by calculating a feature vector for that window. In a second step, a similarity measure is determined for every pair of windows based on the windows feature vectors. The similarity measures are embedded in a similarity matrix for analysis. In a third step, the similarity matrix is factored using Singular Value Decomposition (SVD) to determine the major structural elements of the media stream. The major structural elements or basis vectors are processed to determine segment boundaries and clusters of similar segments.

Once the major structural segments and the clusters of structural segments are identified, a single excerpt can be identified to represent each structural segment cluster by maximizing, for each excerpt, that excerpt's similarity to other members of the corresponding segment cluster. An excerpt for each significantly different segment of the media is generated, while redundant excerpts for similar structural segments in the same cluster are eliminated.

U.S. Published Patent Application 2003/0161396, which is incorporated herein by reference in its entirety, discloses a method for selecting a summary excerpt of a longer media source using similarity analysis. In that method, the similarity matrix is generated as outlined above in the first two steps of the incorporated 946 published application. The similarity matrix is then processed to determine the excerpt with maximal similarity to the entire source stream.

SUMMARY OF THE INVENTION

The singular basis vectors generated when using the singular value decomposition method of the 946 published patent application provide a low-dimensional set of orthonormal directions that express the essential modes of variation in the data. However, the singular value decomposition method has shortcomings. From an analysis standpoint, identifying the singular basis vectors is not deterministic and identifying the correct structural segments is not reliable.

This invention provides systems and methods that use probabilistic factorization of the similarity matrix to identify the basis vectors of the similarity matrix.

This invention separately provides systems and methods that use non-negative matrix factorization of the similarity matrix to identify the basis vectors of the similarity matrix.

This invention separately provides systems and methods that determine the optimal length of summaries representing each major structural element or segment cluster of a media stream.

This invention separately provides systems and methods that determine the starting point of summaries representing each major structural element or segment cluster of a media stream.

This invention separately provides systems and methods that generate summaries representing a multi-modal media stream.

In various exemplary embodiments of systems and methods according to this invention, a media stream is parameterized by calculating a feature vector for all of the windows or frames in the media stream. A similarity measure is determined for each possible pair of windows or frames. The similarity measures are then collected into a similarity matrix. The similarity matrix is then factored using one or more probabilistic methods to identify each major structural component or basis vector of the media stream and to generate, for each component, a component matrix representing that component. The component matrix that represents a particular major structural element or basis vector is processed to determine segment boundaries and clusters of similar segments.

In various exemplary embodiments, systems and methods according to this invention generate a summary containing excerpts from each identified major structural element. The excerpts are extracted or otherwise generated by determining an optimal or appropriate length of each excerpt, then finding an optimal or appropriate starting point for each excerpt that tends to increase or maximize the similarity measure between the frames or windows in the excerpt and the frames or windows in the major structural element that the excerpt represents.

In various exemplary embodiments, systems and methods according to this invention generate summaries from media streams containing a plurality of modes. Summaries of multimode media streams are generated by combining the similarity matrices generated from each mode, then performing probabilistic factorization on the combined matrix. Summaries are then generated from the matrix representing each major structural element or basis vector using the same method as used for a single mode media stream.

These and other features and advantages of this invention are described in, or are apparent from, the following detailed description of various exemplary embodiments of systems and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF EXEMPLARY EMBODIMENTS

Figure 1:
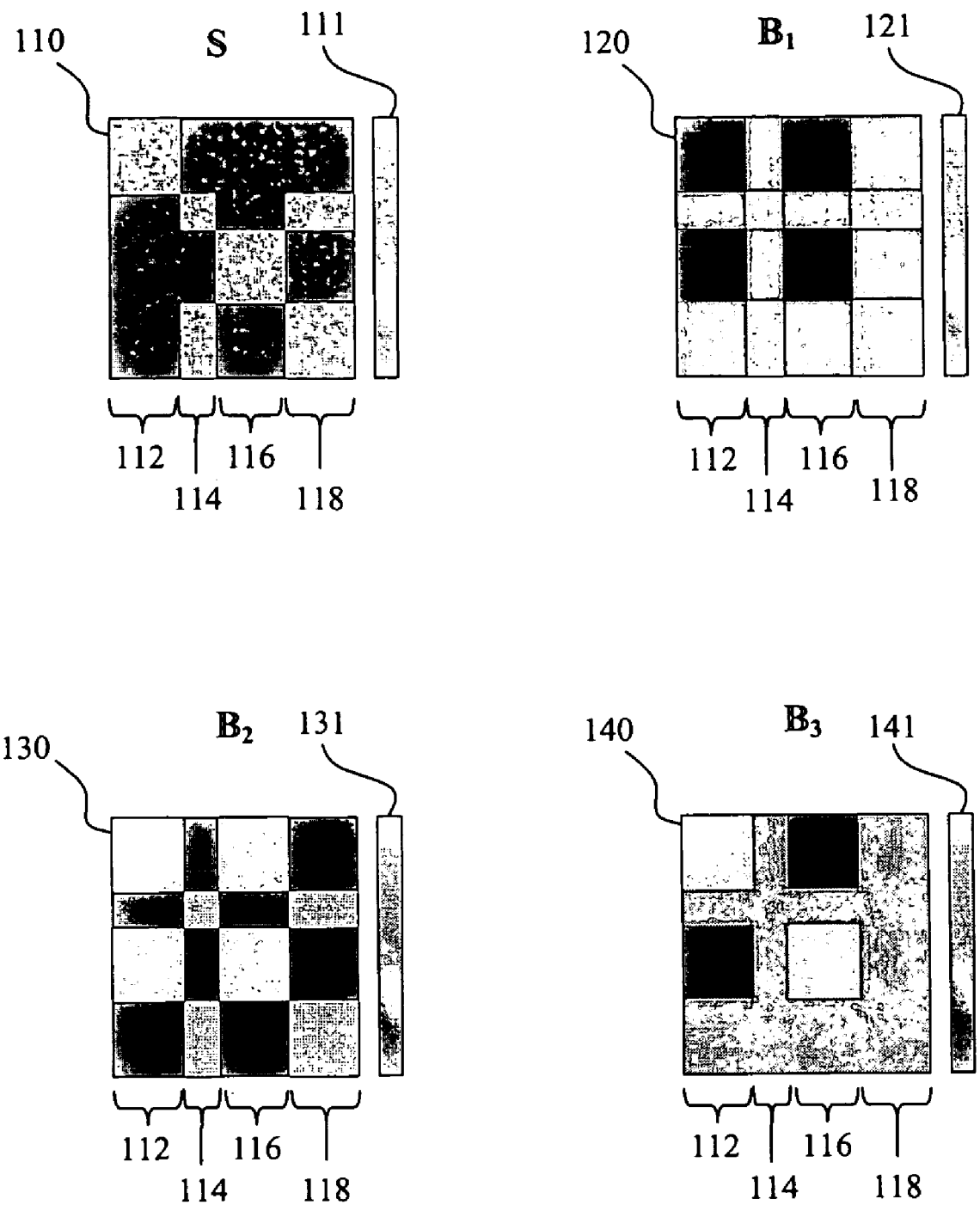
FIG. 1 illustrates a similarity matrix and its basis vectors or terms generated using singular value decomposition.

Various exemplary embodiments of systems and methods for summarizing a media stream according to this invention are usable to summarize any known or later-developed type of media stream, such as, for example, video streams, audio streams, audio/video streams, text documents, and the like. The following detailed discussion may refer to specific types of media streams, such as video streams or audio streams, at various points for familiarity and ease of understanding. This should not be understood to imply that only those types of media streams are appropriately used in systems and methods according to this invention.

One exemplary application for the media summarization systems and methods according to this invention is in summarizing a video stream that is to be sold and distributed over the Internet. In this exemplary application, a prospective Internet video purchaser reviews an audio and/or video work before deciding to purchase the work. The user requests a summary of the work, which activates a summarizing system according to this invention to generate the summary of the audio and/or video work. The summarizing system determines each of the major components in the video work and generates a summary based on samples of the determined major components To avoid disclosing all of the work, such as, for example, a surprise ending of an audio and/or video work, the determined summary may reflect only a percentage of the determined major components in the beginning, middle and/or end of the work. Since the summarizing system may be used to determine boundaries of the major components, the length of each determined major component may be determined and only an appropriate portion of the total length of each component included in the summary. It should be apparent that, in various exemplary embodiments of systems and methods according to this invention, summarizing an audio/video work includes summarizing only the audio components, only the video components and/or both of the audio and video components.

A user of an audio and/or video editing system may also use an exemplary embodiment of summarizing systems and methods according to this invention to provide smart cut/paste functions and other enhanced editing capabilities based on the determined major component boundaries. For example, a user of the video editing system retrieves a video work. The video work is then summarized by the summarizing system to identify the major components of the video work.

The determined major components of the video work are then used to determine the boundaries of the major video components or segments. The determined major component or segment boundaries are then be used provide smart cut and paste operations and/or other enhanced video operations for the determined major components within the video work. The time and expertise required to accomplish the editing of the video work are reduced since important components, such as major scenes of the video work, have been determined. It should be apparent that, in various other exemplary embodiments of systems and methods according to this invention, the summarizing system may be located in the video editing system and/or any accessible location. In various exemplary embodiments, major components of audio, text or any other ordered information may be similarly determined.

In various exemplary embodiments of systems and methods according to this invention, the audio/video information may be encoded into a streaming audio/video protocol such as MPEG-3, MPEG-4, MPEG-J, PNM-RealNetworks protocol, RealVideo protocols from RealNetworks, Microsoft Media Streaming Protocol in the Windows Media® Player from Microsoft Corporation or any other known or later-developed audio and/or video protocol. Various exemplary embodiments of systems and methods according to this invention also provide for operating upon MPEG-4 or any other encoded information to directly access the windowing and parameterizations encoded within the encoded information stream or protocol without requiring separate decoding and encoding.

The ordered information may include audio, video, text or any other information having an ordering dimension, such as time for audio and/or video information and position for text information.

The retrieved and/or received information is analyzed to determine an appropriate type of parameterization to be applied to the received and/or retrieved information. For example, different windowing and parameterization may be applied to audio information, video information, textual information or other types of ordered information. In a first exemplary embodiment according to this invention, audio information, such as an audio waveform, is windowed into frames or the frames associated with the video information accompanying the audio information in the work are used as windows.

A parameterization of the windowed audio information is then determined. The windowed audio information may be parameterized using a Short Time Frame Fourier Transform (STFT), a Fourier Transform, a Mel-Frequency Cepstral Coefficients analysis, a spectrogram, a Fast Fourier Transform (FFT), wavelet decomposition or any other known or later-developed analysis technique without departing from the spirit and scope of this invention.

Similarly, other ordered information such as video and text information may also be windowed. For example, the video information may be windowed by selecting individual frames of video information and/or selecting groups of frames, which are averaged together to determine an average value. Text information may be windowed or framed by selecting words, sentences, paragraphs, an arbitrary number of words, by selecting words based on attributes such as parts of speech, meta-data, XML and /or HTML encoding, importance, term frequency and/or inverse document frequency or any other known or later-developed technique for windowing the text.

A parameterization of the other windowed ordered information is then determined. For example, parameterizing the video information may include use of color histograms, as disclosed in Zhang et al, "Video Parsing, Retrieval and Browsing: an Integrated and Content-Based Solution" in Intelligent Multimedia Information Retrieval, AAA Press, MIT Pres, 1997, which is incorporated herein by reference in its entirety. Alternatively, parameterized decimated video information may be derived from DC coefficients of compression macroblocks, discrete cosine transforms (DCT) may be applied to the video information, or any other known or later-developed method of parameterization of the ordered information may be used.

The parameterized data may be compressed or otherwise reduced in size to reduce the memory storage requirements of the parameterized information. For example, the storage requirements may be reduced by any of the methods discussed in Girgensohn et al. "Video Classification Using Transform Coefficients" in Proc ICASSP '99 Vol. 6 p. 3045-3048, Phoenix, Ariz., IEEE, 1999, which is incorporated herein by reference in its entirety. Alternatively, truncation, principal component analysis, ordered discriminant analysis or any other known or later-developed method of data reduction may be used, either alone or in combination, to create a reduced representation of the parameterized information that preserves salient information about the original windows or frames. For example, the reduced representation of the parameterized audio/video information can reflect a compact feature vector of reduced coefficients for each audio and/or video frame. Since the reduced representation is used for analysis rather than reproduction of the original ordered information, the reduced representation does not need to be able to recover the original information but is used to indicate major components. Thus, the reduced representation may be further reduced.

A similarity measure d may be determined based on the Euclidean distance between the parameterized information vectors a for frames or windows i and j, as:

$$d_E(i,j) \equiv \|v_i - v_j\|. \tag{1a}$$

In various other exemplary embodiments, the similarity measure d may be determined based on the dot product of the parameterized information vectors comprising the similarity matrix. For example, the dot product of two large similarity vectors is:

$$d_d(i,j) \equiv v_i \cdot v_j. \tag{1b}$$

The similarity measure d may be determined using the cosine angle between parameterized information vectors, functions of vector statistics such as the Kullback-Leibler distance or any other known or later-developed method of determining similarity of information vectors without departing from the spirit or scope of this invention. The distance measures or metrics d are incorporated into a similarity matrix such that the similarity measures or elements d(i,j) on the diagonal represents the similarity of each measure or element d to itself. Thus, self-similarity is at a maximum on the diagonal.

The value of each similarity measure or element d(i,j) can be assigned a determined color information value based on comparison to a maximum feature value such as a maximum brightness. Each of the similarity measures or elements d(i,j), i=j having high self-similarity have corresponding higher brightness values and appear along the diagonal.

Thus, as outlined above, in the media summarization method described in the 946 published patent application, the first step is parameterization of the media. In the 946 published patent application, for a video data stream, the feature vectors are computed based on low-order discrete cosine transform (DCT) coefficients. The individual RGB frames are sampled at 1 Hz and transformed into a color space where the three-color channels are approximately decorrelated. The discrete cosine transform (DCT) of each transformed channel is computed and a feature vector is formed by concatenating the resulting low frequency coefficients of the three channels. It should be appreciated that any number of alternate parameterization methods may be employed.

Once the media has been parameterized, as outlined above, the second step described in the 946 published patent application is to calculate the similarity between the feature vectors of different frames and embed the result in a two-dimensional representation. The key is a measure d of the similarity between a pair of feature vectors $v_i$ and $v_j$ calculated from frames i and j. In various exemplary embodiments according to this invention, a useful similarity distance measure is the cosine angle between the parameter vectors:

$$d_c(v_i, v_j) = \langle v_i, v_j \rangle / \|v_i\| \|v_j\| \tag{1c}$$

This similarity distance measure $d_c(v_i,v_j)$ has the property that it yields a large similarity score even if the vectors are small in magnitude.

FIG. 1 shows a similarity matrix S and a number of basis vectors or terms $B_k$ generated using singular value decomposition. To consider the similarity between all possible frames, the similarity distance measures are embedded into a similarity matrix 110 as shown in FIG. 1, such that each position S(i,j) in the similarity matrix 110 is defined as:

$$S(i,j) = d_c(v_i, v_j) \tag{2}$$

The x-axis of the similarity matrix 110 represents a frame i, while the y-axis represents a frame j. The scale 111 correlates the similarity distance measure $d_c(v_i,v_j)$ to a gray scale, such as white for a maximum score of 1.4 and black for a score of zero. The diagonal representing i=j must have the maximum similarity distance measure $d_c(v_i,v_j)$ score of 1.4 and is white.

In the similarity matrix 110 shown in FIG. 1, various media segments 112, 114, 116 and 118 can be identified. In particular, in the similarity matrix 110, those positions S(i,j) where i and j are in the same segment show a high similarity score. Additionally, in the similarity matrix 110, those positions S(i,j) where the frame i is in one segment, such as the segment 114, and the frame j is in another segment, such as the segment 118, can also show a high similarity score. This indicates that the segments 114 and 118 form a cluster and can be treated as a single basis vector or structural component of the media corresponding to the similarity matrix 110.

The third step of the media summarization method described in the 946 published patent application, as outlined above, is matrix factoring using singular value decomposition (SVD). In this step, new matrices or terms such as 120, 130 and 140 shown in FIG. 1 are generated that represent the basis vectors or segment clusters $B_1$, $B_2$ and $B_3$ of the media being summarized. Each position in the factorized matrices 120-140 are defined as:

$$B_k(i,j) = \sigma_k U(i,k) V(k,j), \tag{3a}$$

where:
U(i,k) is an N×K matrix with orthonormal columns;
V(k,j) is a K×N matrix with orthogonal rows;
N is the number of frames;
K is the number of basis vectors;
k=1 to K; and $$S \cong U\Sigma V^T = \sum_{k=1}^{K} B_K, \tag{3b}$$

where $\Sigma$ is a diagonal matrix with elements $(i,i) = \sigma_i$.

It should be appreciated that, in various exemplary embodiments, the value of K is determined as the effective rank of S, based on the singular values $\sigma_k$ using an absolute threshold either applied directly to the singular values or applied to the ratio of the $k^{th}$ singular value to the largest singular value. The value of K can also be set by the user, determined based on prior information and/or knowledge about the content of the ordered information that is being summarized. It should also be appreciated any other known or later-developed technique that is appropriate for determining the value of K can be used.

The K columns of the matrix U(i,k) are the basis vectors of the factorization and the K rows of the matrix V(k,j) are the coefficient representations of the columns of the similarity matrix 110 onto this basis. See M. Berry et al., "Using Linear Algebra for Intelligent Information Retrieval" SIAM Review, 37(4):573-595, 1995, for further details on how $\sigma_k$, U(i,k) and V(k,j) are determined.

The x-axis of the factorized matrices 120, 130 and 140 shown in FIG. 1 represents the frame i and the y-axis represents the frame j. The scale 121 of the factorized matrix 120 correlates the position value $B_1(i,j)$ to a gray scale, such as white for a maximum score of 1.0 and black for a score of 0.5. The factorized matrix 120 indicates high scores in the regions where i and j are both in the segment 114 or both in the segment 118. The factorized matrix 120 also indicates high scores in regions where i is in the segment 114 and j is in the segment 118, identifying these segments as a basis vector or cluster.

The scale 131 of the factorized matrix 130 correlates the position value $B_2(i,j)$ to a gray scale, such as white for a maximum score of 0.4 and black for a score of -0.4. The factorized matrix 130 indicates high scores in regions where i is in the segment 114 and j is in the segment 118, identifying these segments as a basis vector or cluster. The factorized matrix 130 also indicates high scores in regions where i is in the segment 112 and j is in the segment 116, incorrectly identifying these segments as a basis vector or cluster. The scale 141 of the factorized matrix 140 correlates the position value $B_3(i,j)$ to a gray scale, such as white for a maximum score of 0.5 and black for a score of -0.5. The factorized matrix 140 indicates high scores in the regions where i and j are both in the segment 112 or both are in the segment 116. The factorized matrix 140 also indicates negative scores in regions where i is in the segment 112 and j is in the segment 116, indicating that the segments 112 and 116 are not part of the same cluster.

Figure 2:
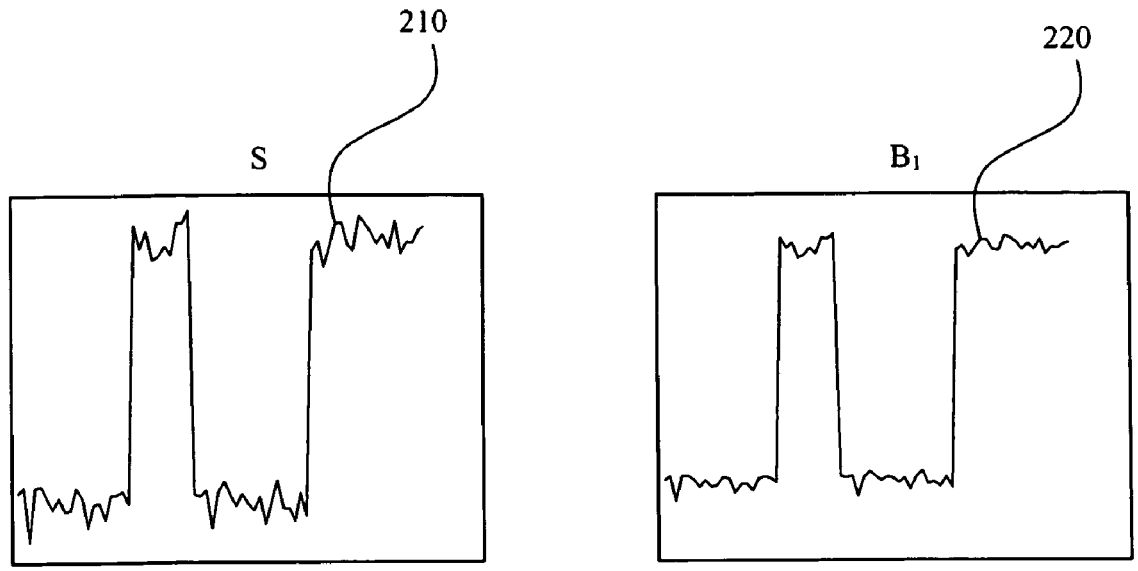
FIG. 2 is a set of graphs illustrating rowsums of the similarity scores of the similarity matrix and the basis vectors or terms generated using singular value decomposition.
Figure 2:
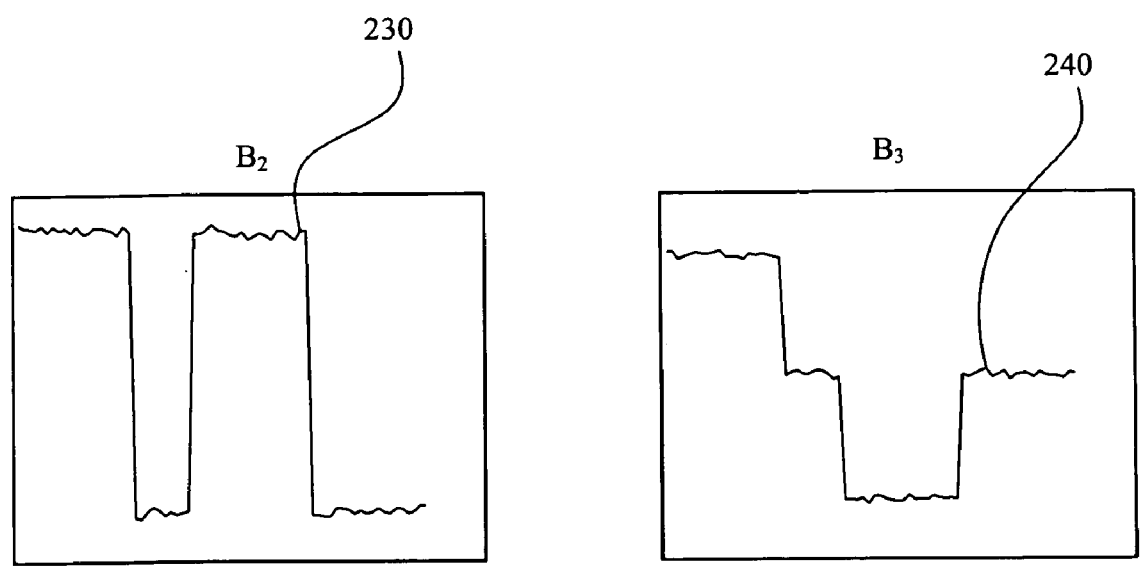

FIG. 2 graphically illustrates rowsums of the similarity scores of the similarity matrix 110 and the basis vectors 120-140 generated using singular value decomposition. Each rowsum 210 of the similarity matrix 110 is the sum of all the values S(i,j) in the $i^{th}$ row of the matrix. The rowsums for each row i are then plotted as a function of i. The rowsums 210 of the similarity matrix 110 do not accurately identify all basis vectors and clusters. The rowsums 220 of the factorized matrix 120 are the sums of all the values $B_1(i,j)$ in the i rows of the factorized matrix 120 plotted as a function of i. The values of the rowsums 220 for the frames i in the segments 114 and 118 are significantly greater than that for the other frames, making it easy to identify the segments 114 and 118 as the first basis vector cluster by analysis.

The rowsums 230 of the factorized matrix 130 are the sums of all the values $B_2(i,j)$ in the i rows of the factorized matrix 130, plotted as a function of i. The values of the rowsums 230 for the frames i in the segments 112 and 116 are significantly greater than that of the other frames, making it possible to mistakenly identify the segments 112 and 116 as a basis vector cluster in analysis. The rowsums 240 of the factorized matrix 140 are the sums of all the values $B_3(i,j)$ in the i rows of the factorized matrix 140, plotted as a function of i. The values of the rowsums 240 for the frames i in the segments 112, 114, 116 and 118 are extremely small and are not reliable for analysis.

Figure 3:
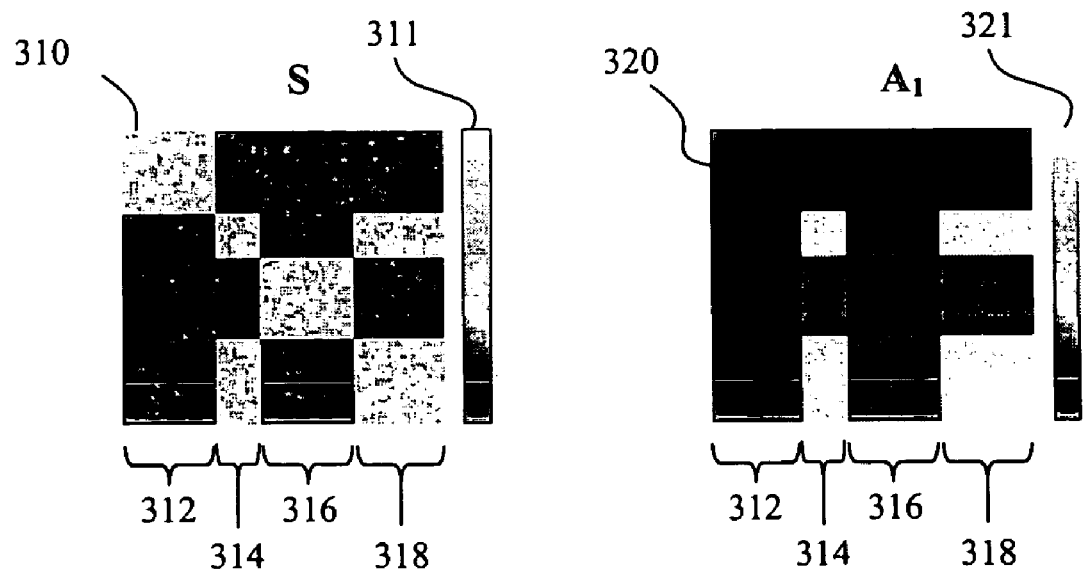
FIG. 3 illustrates a similarity matrix and its basis vectors or terms generated using non-negative matrix factorization according to this invention.
Figure 3:
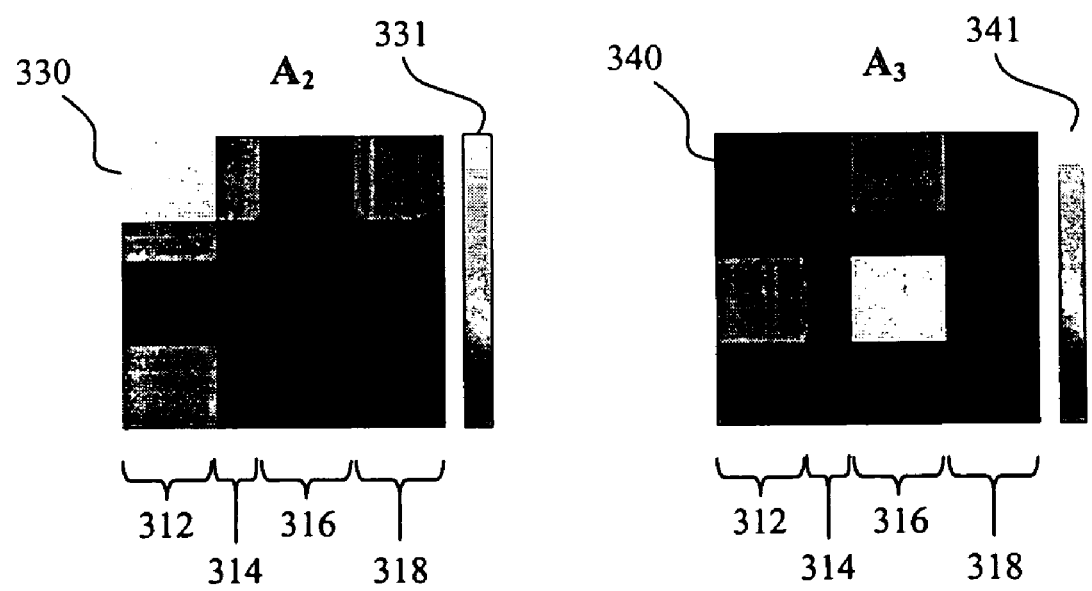

FIG. 3 illustrates a similarity matrix S and a number of basis vectors or terms $A_k$ generated using non-negative matrix factorization (NMF) according to this invention. In the similarity matrix 310 shown in FIG. 3, each position S(i,j) in the matrix is defined as:

$$S(i,j) = \exp(d_c(v_i, v_j) - 1) \quad (4)$$

where each similarity element (i,j) is defined using the exponential variant of Eq. (1c). The x-axis of the similarity matrix 310 represents a frame i and the y-axis represents a frame j. The scale 311 correlates the similarity distance measure S(i,j) to a gray scale, such as white for a maximum score of 1.4 and black for a score of zero. The diagonal representing i=j must have the maximum similarity distance measure S(i,j) score of 1.4 and is white.

It should be appreciated that the non-negative factorization maximizes a log-likelihood function that assumes that the similarity data is generated according to a Poisson noise model. The maximization is performed subject to non-negativity constraints. That is, the non-negativity constraints imply that the resulting basis vectors are combined to approximate the columns of S without canceling one another. The non-negative factorization of an N×N matrix S defines a linear approximation to S, which is denoted as $S_b = WH$. Using an iterative approach, $S_b$ converges to a local maximum of the function:

$$L_{NMF} = \sum_{i,j} S(i,j) \log(S_b(i,j)) - S_b(i,j), \text{ and} \quad (5)$$

$$S_b = WH; \quad (6)$$

where:

W is a N×K matrix whose columns are the basis vectors for the factorization and;

H is as K×N matrix of coefficient representations of the columns of S onto the basis vectors.

By determining the non-negative matrix factorization of the similarity matrix S, each component matrix A, as defined below, represents a cluster of segments with high similarity. These terms A of the matrix sum of Eq. 5 represent the structural components of the similarity matrix S. In the singular value decomposition, the columns of W are orthonormal and the rows of H are orthogonal. As a result, when combined, they both add and cancel. In contrast, the combinations of the non-negative matrix factorization basis vectors and coefficients are strictly additive.

In the similarity matrix 310 shown in FIG. 3, a number of media segments 312, 314, 316 and 318 can be identified. Each segment 312, 314, 316 and 318 corresponds to a square region along the main diagonal of the similarity matrix 310, in which those positions S(i,j) where the frames i and j are in the same segment show a high similarity score. Additionally, in the similarity matrix 310, those positions S(i,j) where the frame i is in one segment, such as the segment 314, and the frame j is in another segment, such as the segment 318, can also show a high similarity score. This indicates that the segments 314 and 318 form a cluster and can be treated as a single basis vector or structural element of the source stream.

The similarity matrix 310 is then factored using non-negative matrix factorization (NMF). In this step, new matrices 320, 330 and 340 are generated that represent the basis vectors $A_k$ or segment clusters of the media. This factorization is used to generate the terms $A_k$ that represent a structural decomposition of S. A given factorized matrix 320, 330 or 340, corresponding to the terms $A_1$, $A_2$ and $A_3$, respectively, is defined as:

$$A_k(i,j) = W(i,k)H(k,j) \quad (7a)$$

where:

$W(i,k)$ is an N×K matrix;

$H(k,j)$ is a K×N matrix;

N is the number of frames or separable portions of the stream being summarized;

K is the number of basis vectors; and k is an integer between 1 and K, inclusive; and $$S \cong WH = \sum_{k=1}^{K} A_k. \quad (7b)$$

It should be appreciated that, in various exemplary embodiments, the value of K is determined by first estimating the effective rank K of S, and then by estimating the K-term of the probabilistic factorization of S. The terms $A_1, A_2, \ldots A_K$ are then processed to determine the desired, or ideally, optimal, length L summaries with respect to within-class similarity, as is discussed in greater detail below.

The K columns of the matrix $W(i,k)$ are the basis vectors of the factorization and represent the significant parts of S, i.e., the significant block of high similarity. The K rows of the matrix $H(k,j)$ are the coefficients representing the columns of the similarity matrix 310 onto this basis. The factorization is performed subject to non-negativity constraints that insure that the resulting basis vectors can be combined to approximate the columns of the similarity matrix 310 without canceling one another. D. Lee et al., "Learning the parts of objects by non-negative matrix factorization" Nature, 401: 788-791, 1999, which is incorporated herein by reference in its entirety, provides for further details on how the matrices $W(i,k)$ and $H(k,j)$ are determined.

It should be appreciated that probabilistic clustering (PC), as described in T. Hoffman, "The Cluster-Abstraction Model: Unsupervised Learning of Topic Hierarchies from Text Data," Proc. IJCAI, 1999, can be used instead of the non-negative matrix factorization (NMF) to factorize the similarity matrix 310. It should also be appreciated that probabilistic latent semantic analysis (PLSA), as described in T. Hoffman, "Unsupervised Learning by Probabilistic Latent Semantic Analysis," Machine Learning 42:177-96, 2001, can be used instead of the non-negative matrix factorization (NMF) to factorize the similarity matrix 310. In general, in systems and methods according to this invention, any other known or later-developed probabilistic decomposition or probabilistic matrix factorization can be used to factor the similarity matrix.

The x-axis of the factorized matrices 320, 330 and 440 shown in FIG. 3 represents the frame i and the y-axis represents the frame j. The scales 321, 331 and 341 of the factorized matrices 320, 330 and 340, respectively correlate the position value $A_k(i,j)$ to a gray scale, such as white for a maximum score of 1.2 and black for a score of 0. The factorized matrix 320 indicates high scores in the regions where the frames i and j are both in the segment 314 or are both in the segment 318. The factorized matrix 320 also indicates high scores in regions where the frame i is in the segment 314 and the frame j is in segment 318 correctly identifying the segments 314 and 318 together as a first basis vector or cluster.

The factorized matrix 330 indicates high scores in the regions where the frames i and j are both in the segment 312, identifying the segment 312 as a second basis vector. The factorized matrix 340 indicates high scores in the regions where the frames i and j are both in the segment 316, identifying the segment 316 as a third basis vector.

Figure 4:
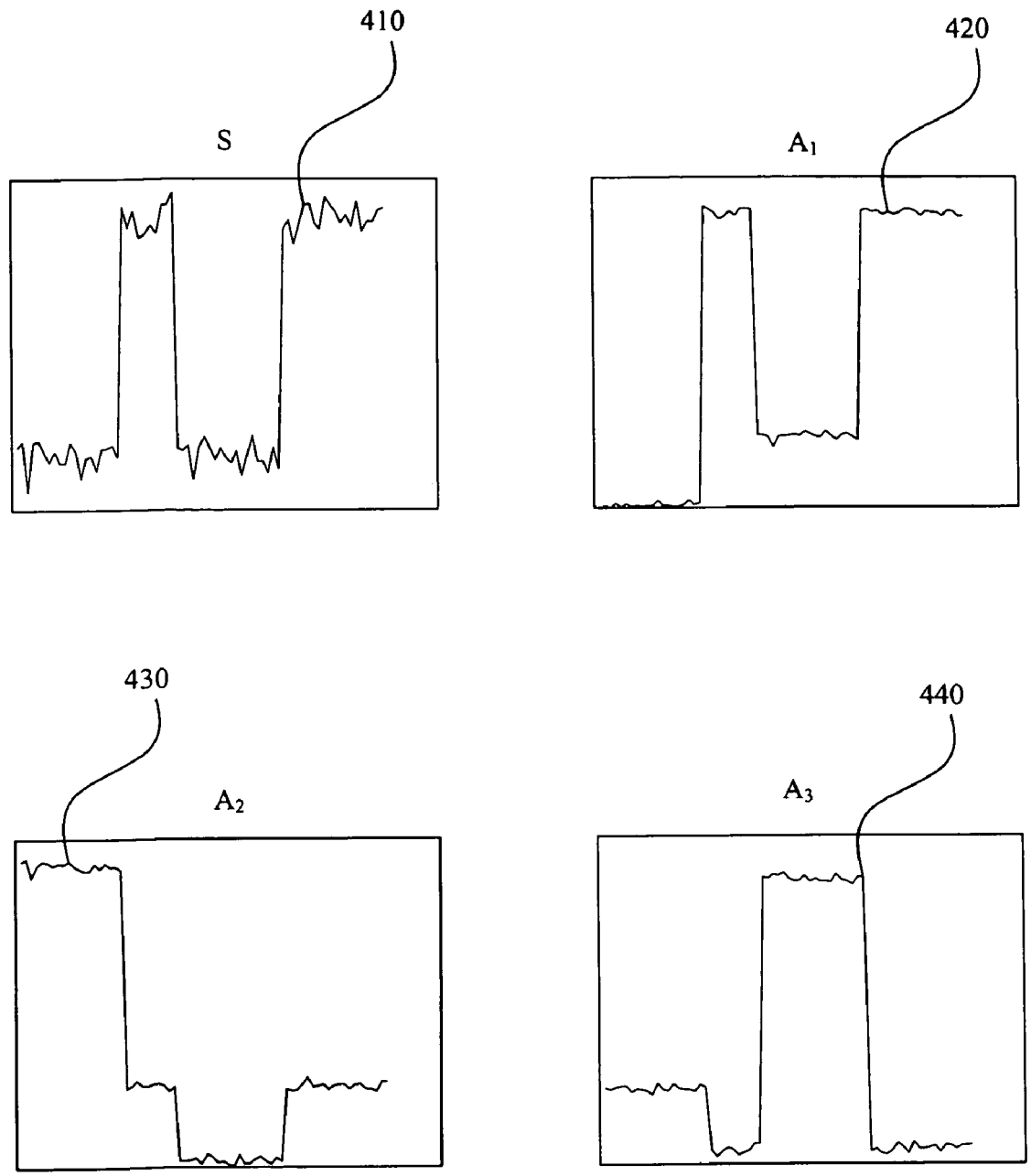
FIG. 4 is a set of graphs illustrating the similarity scores for summaries of the similarity matrix and the basis vectors or terms generated using non-negative matrix factorization.

FIG. 4 graphically illustrates rowsums of the similarity scores of the similarity matrix S and the basis vectors or terms $A_k$ generated using non-negative matrix factorization (NMF). It should be appreciated that, in FIG. 4, each similarity rowsum 410 is determined as:

$$\bar{S}(i) = \sum_{j=1}^{N} S(i, j). \quad (7c)$$

Each similarity rowsum 410 of the similarity matrix 310 is the sum of all the values $S(i,j)$ in the i row of the similarity matrix 310, plotted as a function of i. We also compute rowsums for each of the matrices $A_k$ according to $$\bar{A}_k(i) = \sum_{j=1}^{N} A_k(i, j). \quad (7d)$$

The rowsums 410 do not accurately identify all basis vectors and clusters of the similarity matrix 300. The rowsums 420 of the factorized matrix 320 are the sums of all the values $A_1(i,j)$ in the i rows of the factorized matrix 320, plotted as a function of i. The values of the rowsums 420 of the factorized matrix 320 for the frames i in the segments 314 and 318 are significantly greater than that of the other frames, making it easy to identify the segments 314 and 318 as a first basis vector cluster by analysis.

The rowsums 430 of the factorized matrix 330 are the sums of all the values $A_2(i,j)$ in the i rows of the factorized matrix 330, plotted as a function of i. The values of the rowsums 430 of the factorized matrix 330 for the frames i in the segment 312 are significantly greater than that of the other frames, making it easy to identify the segment 312 as a second basis vector cluster by analysis. The rowsums 440 of the factorized matrix 340 are the sums of all the values $A_3(i,j)$ in the i rows of the factorized matrix 340, plotted as a function of i. The values of the rowsums 440 of the factorized matrix 340 for the frames i in the segment 316 are significantly greater than that of the other frames, again making it easy to identify the segment 316 as a third basis vector cluster by analysis.

Figure 5:
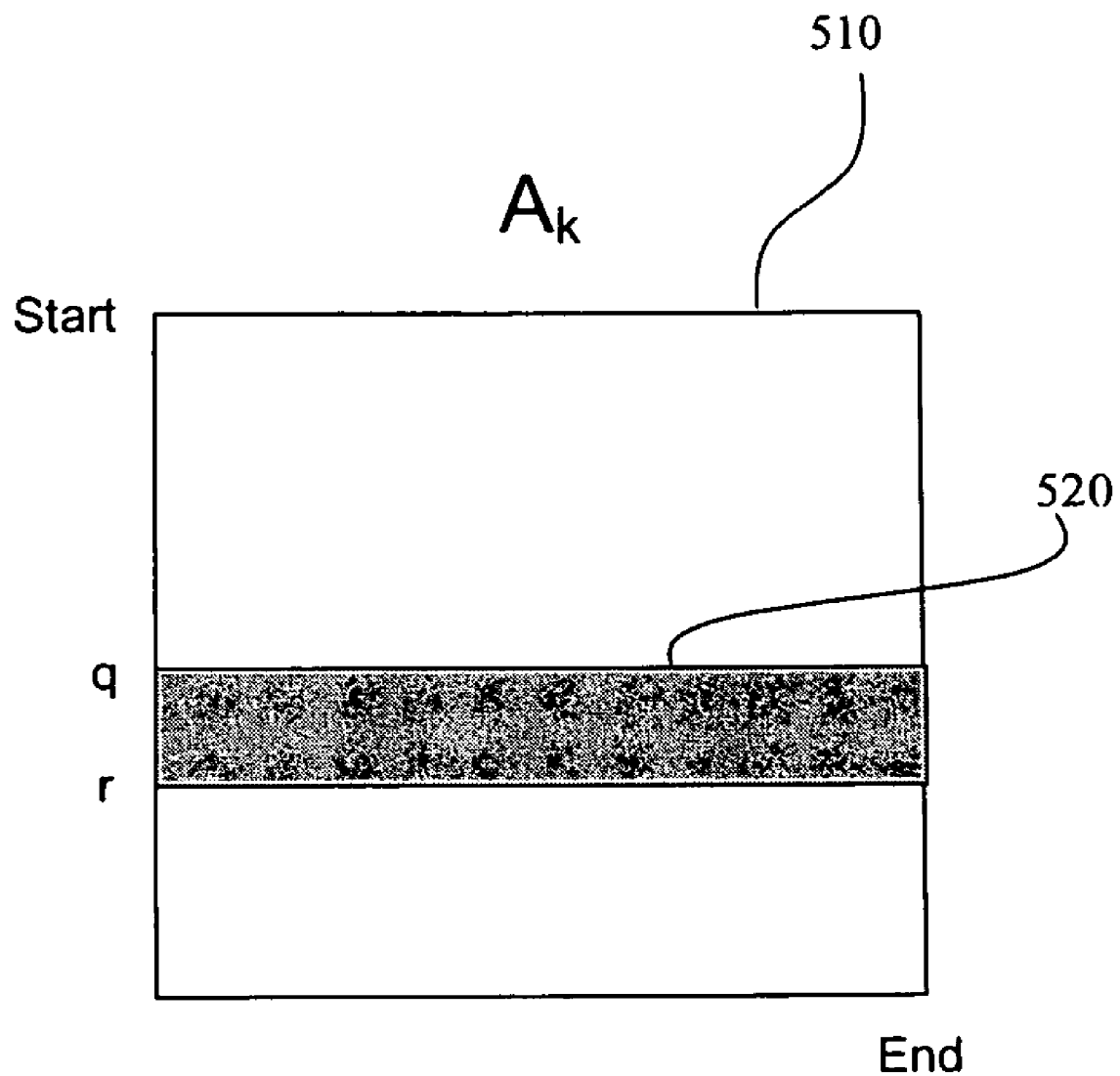
FIG. 5 illustrates a media interval over which a summary similarity score is determined according to this invention.

FIG. 5 shows one exemplary factorized component matrix $A_k$. The factorized component matrices 320-340 can be used to determine representative excerpts of a desired length L to be extracted from each segment cluster or basis vector of the media stream being summarized. As shown in FIG. 5, a measure or score, of how representative a particular excerpt is, is obtained by determining an average within-class (basis vector) component matrix $\bar{A}_k(q,r)$ for a particular excerpt, such as the excerpt 520. The values for the component matrix $A_k(i,j)$ are summed over the excerpt area 520 and divided by the size of the excerpt area 520. That is, $\bar{A}_k(q,r)$ is determined as:

$$\overline{A}_k(q, r) = \frac{1}{N(r-q)} \sum_{m=q}^{r} \sum_{n=1}^{N} A_k(m, n) \qquad (8)$$

where:

r is the ending frame of the excerpt; and q is the starting frame of the excerpt.

The average within-class(basis vector) component matrix $\overline{A}_k(q,r)$ is determined for excerpts with all possible starting points r, and possibly for all desired lengths L. The excerpt that has the starting point, and possibly the length, that results in the highest average within-class(basis vector) component matrix $\overline{A}_k(q,r)$ is selected as the optimal or desired excerpt for that basis vector. The process is then repeated for each basis vector.

It should be appreciated that each component matrix $A_k$ quantifies the within-class similarity since each component matrix $A_k$ represents that part of the similarity matrix corresponding to the segment cluster that the selected excerpt must represent in the final summary. It should be appreciated that, in various exemplary embodiments of systems and methods according to this invention, to select the summary excerpt for a given component matrix $A_k$, a score $Q_L^{(k)}(i)$ for the $i^{th}$ starting position of the $k^{th}$ component is defined as:

$$Q_L^{(k)}(i) = \frac{1}{NL} \sum_{m=i}^{i+L} \sum_{n=1}^{N} A_k(m, n) \qquad (9)$$

The rowsums corresponding to the inner sums of Eq. (7) are shown in FIG. 4. It should be appreciated that, in various exemplary embodiments of systems and methods according to this invention, a starting point $q_L^{(k)}$ for the excerpt to be extracted from the $k^{th}$ component is determined. In various exemplary embodiments, the starting point $q_L^{(k)}$ is that point that maximizes the score $Q_L^{(k)}$ for the $k^{th}$ component. That is:

$$q_L^{(k)} = \underset{1 \leq i \leq N-L}{\mathrm{ArgMax}} (Q_L^{(k)}(i)) \qquad (10)$$

The excerpt for the kth component matrix $A_k$ is then the excerpt of the $k^{th}$ segment of the media stream being summarized that extends between a start point or time $q_L^{(k)}$ and an end point or time $q_L^{(k)}+L$. In various exemplary embodiments of systems and methods according to this invention, the summary is then combined or compiled by concatenating the k excerpts obtained from the k segments.

It should be appreciated that, in various exemplary embodiments, the length L, rather than being a fixed value, can vary according to an importance attached to the component that the excerpt is a part of. For example, in various exemplary embodiments the desired total length $L_T$ of the summary can be defined. Then, the lengths $l_k$ of the various components K are determined so that the lengths $l_k$ sum to the total lengths $L_T$ and the length $l_k$ of each component k is related in some way to an importance of that component k. In various exemplary embodiments, the length $l_k$ of a given component k is:

$$l_k = L_T \frac{\sum_{i,j} A_k(i, j)}{\sum_k \sum_{i,j} A_k(i, j)} \qquad (11)$$

That is, in such exemplary embodiments, the total length $L_T$ of the summary is fixed, and a portion of that total length $L_T$ is distributed to each component k based on that component k's average similarity relative to the sum of the average similarities for all of the components K. It should be appreciated that the total length $L_T$ can be distributed to the various components k based on any appropriate known or later-developed distribution scheme.

It should also be appreciated that, in the exemplary embodiments outlined above, minimal assumptions about the characteristics of the stream of ordered information were made. However, in various exemplary embodiments, it may be appropriate to base the decomposition of the stream of ordered information on one or more such characteristics. In various exemplary embodiments, this can be accomplished by applying a weighting function to emphasize specific portions or parts of the stream of ordered information. In such exemplary embodiments, a weighted score $S_w$ can be generated by altering Eq. (7c) as:

$$\overline{S}_w(q, r) = 1/N(r-q) \sum_{m=q}^{r} \sum_{n=1}^{N} w(n) S(m, n). \qquad (12)$$

When using non-negative matrix factorization (NMF), multi-mode media, such as a multimedia stream that contains both video and audio portions, can be summarized similarly. In such exemplary embodiments, a similarity matrix for each mode is generated portions and combined as:

$$S_c(i,j) = [S_a(i,j) S_v(i,j)], \qquad (13)$$

where:

$S_c(i,j)$ is a combined N×2N similarity matrix;

$S_a(i,j)$ is an N×N audio similarity matrix; and $S_v(i,j)$ is an N×N video matrix.

Then, a joint likelihood model for the clustering can be created as:

$$L_{NMF} = \sum_{i=1}^{N} \sum_{j=1}^{2N} S_C(i, j) \log(S_b(i, j)) - S_b(i, j), \text{ and} \qquad (14)$$

$$S_b = WH; \qquad (15)$$

where:

W is a N×K matrix whose columns are the basis vectors for the factorization and;

H is as K×2N matrix of encodings of the columns of $S_C$ onto the basis vectors.

It should be appreciated that this is a straightforward extension of Eq. 5. The above-outlined summarization process can be applied to the larger matrix using an N×K matrix W and a K×2N matrix H to generate K different N×2N factorization matrices $A_k$.

Figure 6:
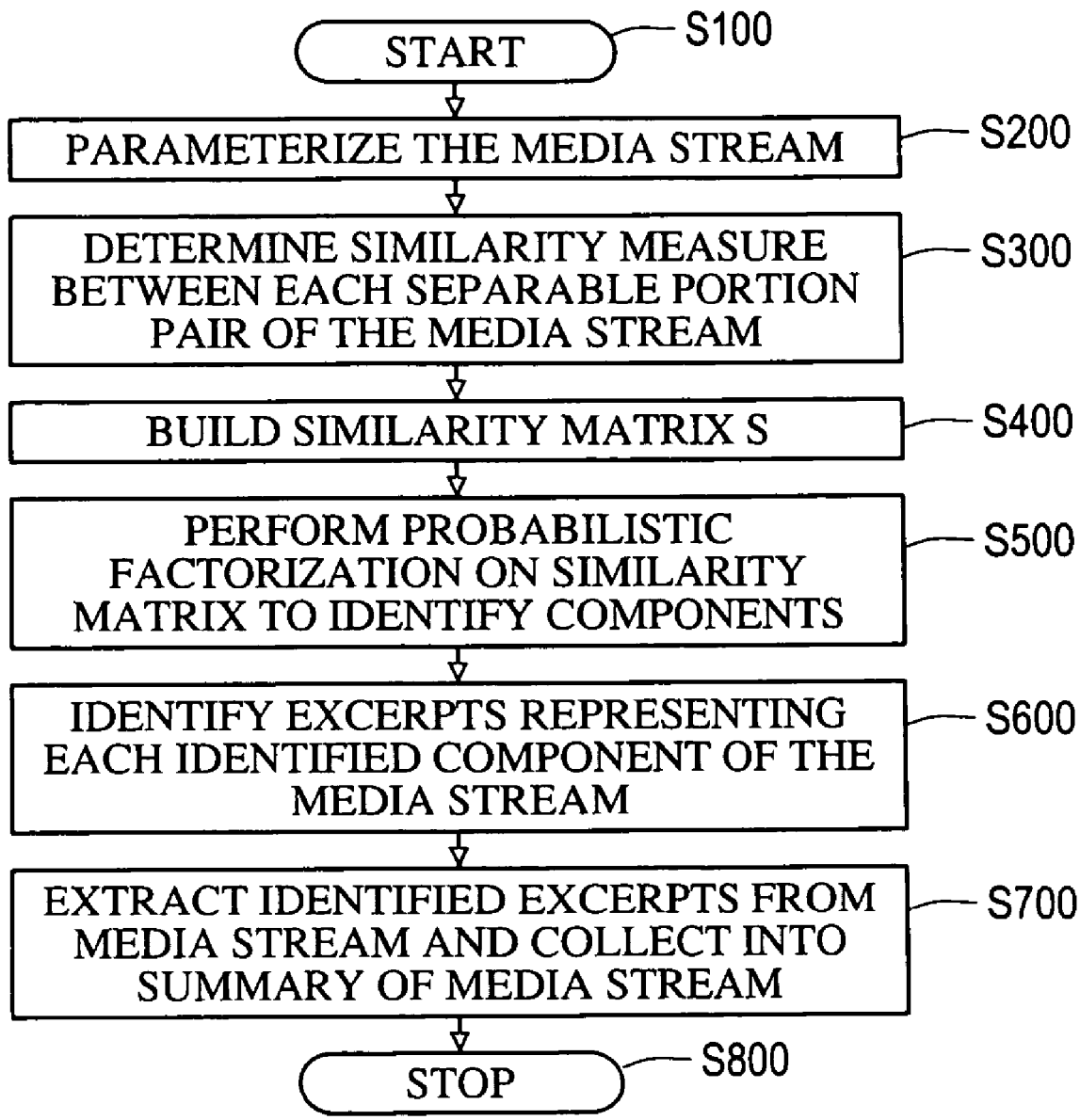
FIG. 6 is a flowchart outlining one exemplary embodiment of a method for generating summaries of a media steam according to this invention.

FIG. 6 is a flowchart outlining one exemplary embodiment of a method for generating summaries of a media steam according to this invention. As shown in FIG. 6, operation of the method begins in step S100, and continues to step S200, where the media stream is parameterized. Then, in step S300, a similarity measure is determined for each pair-wire set of frames in the media using Eq. (1c). Next, in step S400, a similarity matrix S(i,j) is generated using Eq. (4). Operation then continues to step S500.

In step S500, the similarity matrix S(i,j) is factored using one or more probabilistic techniques, such as, for example, a non-negative matrix factorization (NMF) technique, to generate one or more factorized matrices. In this case, the similarity matrix S(i,j) is factored using Eq. (5). Next, in step S600, excerpts representing each basis vector of the media are identified using the resulting factorized matrix or matrices. Then, in step S700, the identified excerpts are extracted from the media stream and collected into a summary of the media stream. Operation then continues to step S800, where operation of the method ends.

Figure 7:
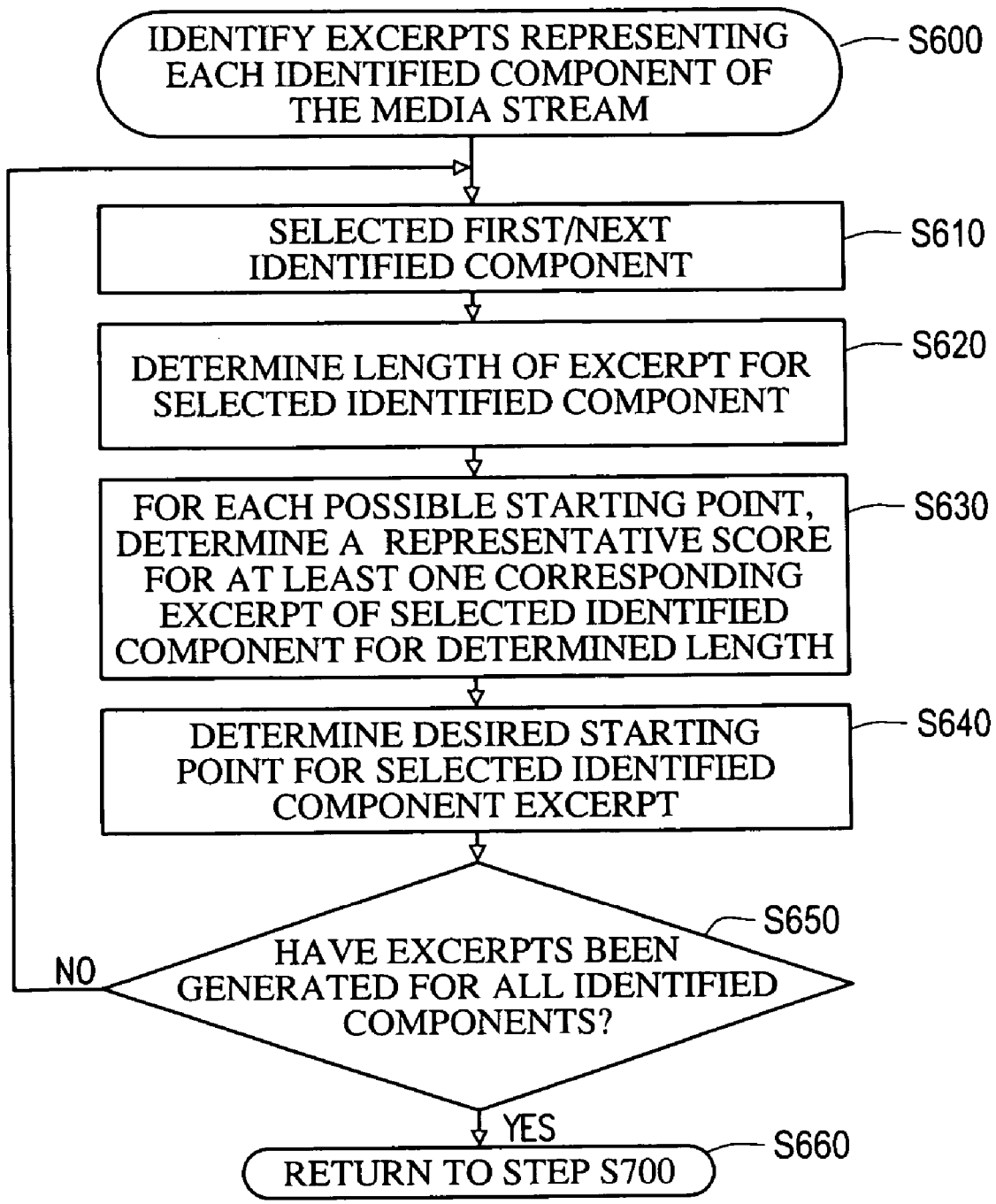
FIG. 7 is a flowchart outlining in greater detail one exemplary embodiment of a method for generating the excerpts for each basis vector or significant structural component of a media stream according to this invention.

FIG. 7 is a flowchart outlining in greater detail one exemplary embodiment of a method for identifying the excerpts for each basis vector or significant structural component of a media stream according to this invention. As shown in FIG. 7, operation of the method begins in step S600, and continues to step S610, where the first/next basis vector is selected. Then, in step S620, the length of the summary to be generated is determined. The length of the summary can be determined by a default parameter, by operator input and/or by adjusting a default length based on the relative length or some other parameter of the basis vector. It should be appreciated that, in some exemplary embodiments, two or more lengths can be used, and/or the length can be determined dynamically as the excerpts are scored, so that each excerpt at a given starting point has a length that maximizes its score. Next, in step S630, a representative score of each excerpt, corresponding to every possible starting point, is generated using Eq. (6). Operation then continues to step S640.

In step 640, an optimal or desired starting point for the excerpt of the selected basis vector is determined by choosing the excerpt that generated the highest score in step S630. Then, in step S650, a determination is made whether excerpts have been generated for all basis vectors. If excerpts have not been generated for all basis vectors, operation returns to step S610. Otherwise, operation continues to step S660, where operation returns to step S700.

Figure 8:
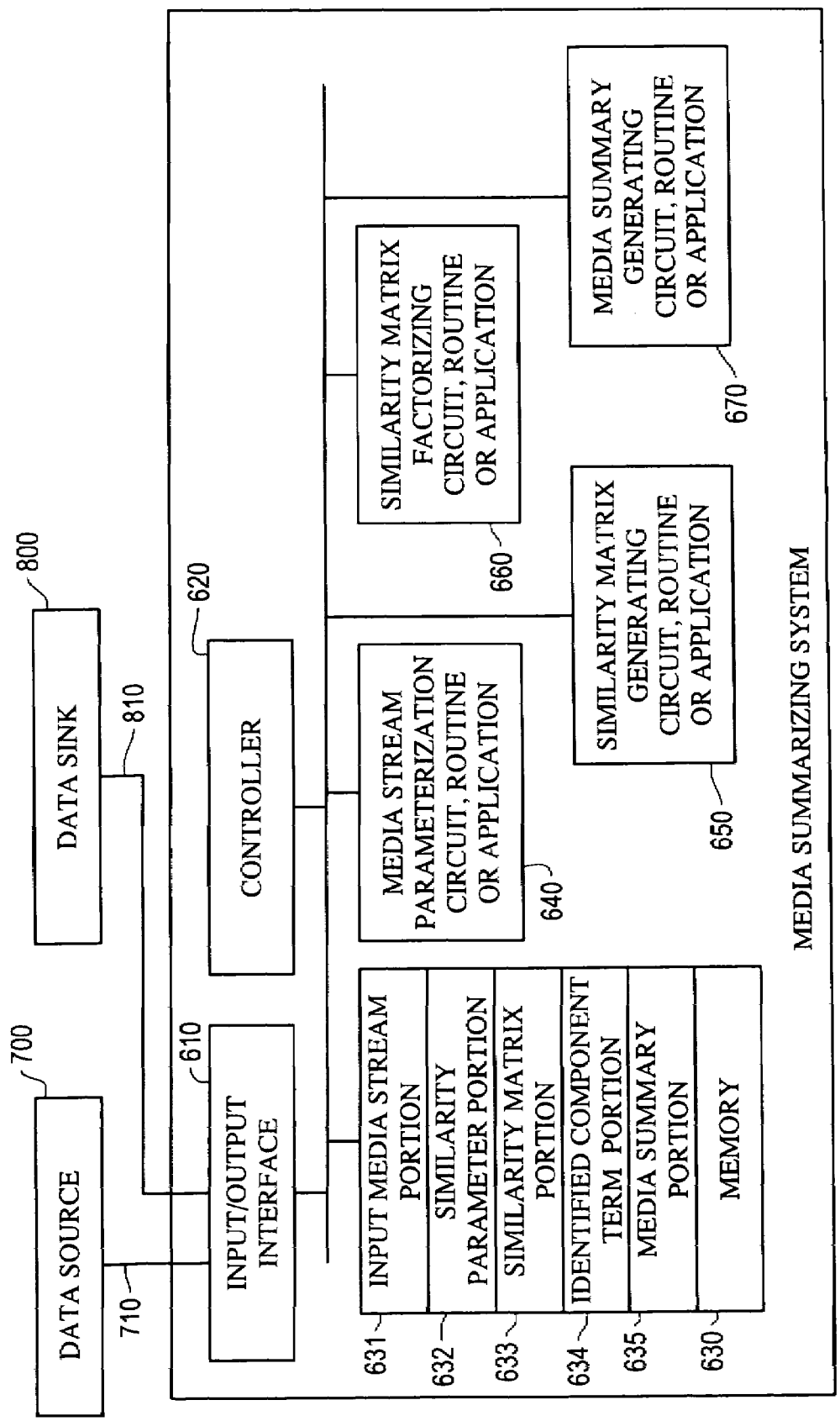
FIG. 8 is a block diagram of one exemplary embodiment of a media summarizing system according to this invention.

FIG. 8 shows one exemplary embodiment of a media summarizing system 600 usable to generate representative summaries of a media stream according to this invention. As shown in FIG. 8, the media summarizing system 600 includes an input/output interface 610, a controller 620, a memory 630, a media stream parameterization circuit, routine or application 640, a similarity matrix generating circuit, routine or application 650, a similarity matrix factorizing circuit, routine or application 660, and a media summary generating circuit, routine or application 670, interconnected by one or more control and/or data busses and/or application programming interfaces or the like 680. As shown in FIG. 8, a data source 700, and a data sink 800 are connected to the media summarizing system 600 by links 710 and 810, respectively.

In general, the data source 700 shown in FIG. 8 can be any known or later-developed device that is capable of supplying a media stream to be summarized to the media summarizing system 600. In general, the data source 700 can be any one of a number of different sources, such as a scanner, a digital copier, a facsimile device, a digital camera, a digital video recorder or the like that is suitable for generating electronic data as a media stream, or a device suitable for storing and/or transmitting electronic data as a media stream, such as a client or server of a network, or the Internet, and especially the World Wide Web. In general, the data sink 800 can be any known or later-developed device that is usable to display, store, transmit or otherwise receive media summaries from the media summarizing system 600.

The data source 700 and/or the data sink 800 can be integrated with the media summarizing system 600. In addition, the media summarizing system 600 may be integrated with devices providing additional functions in addition to the data source 700 and/or the data sink 800.

Each of the links 710 and 810 connecting the data source 700 and data sink 800, respectively, to the media summarizing system 600, can be and/or include a direct cable connection, a modem, a local area network, a wide area network, an intranet, an extranet, the Internet, the public switched telephone network, any other distributed processing network, or any other known or later developed connection device. It should be appreciated that each of the links 710 and 810 may include one or more wired and/or wireless portions. In general, each of the links 710 and 810 can be of any known or later-developed connection system or structure usable to connect the respective devices to the media summarizing system 600. It should be understood that the links 710 and 810 do not need to be of the same type.

As shown in FIG. 8, the memory 630 can be implemented using any appropriate combination of alterable, volatile, or non-volatile memory or non-alterable, or fixed memory. The alterable memory, whether volatile or non-volatile can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk and disk drive or the like.

It should be understood that various embodiments of the media summarizing system 600 can be implemented as software stored on a computer readable medium that is executable on a programmed general purpose computer, a special purpose computer, a microprocessor or the like. Such a computer readable medium includes using a carrier wave or the like to provide the software instructions to a processing device. It should also be understood that each of the circuits, routines, applications, managers, procedures, objects or the like shown in FIG. 8 can be implemented as portions of a suitably programmed general-purpose computer. Alternatively, each of the circuits, routines, applications, managers, procedures, objects or the like shown in FIG. 8 can be implemented as physically distinct hardware circuits within an ASIC, using a digital signal processor (DSP), using a FPGA, a PDL, a PLA and/or a PAL, or using discrete logic elements or discrete circuit elements. The particular form of the circuits, routines, applications, managers, procedures, objects or the like shown in FIG. 8 will take is a design choice and will be obvious and predictable to those skilled in the art. It should be appreciated that the circuits, routines applications, managers, procedures, objects or the like shown in FIG. 8 do not need to be of the same design.

It should be appreciated that a routine, application, manager, procedure, object or the like can be a self-consistent sequence of computerized steps that lead to a desired result. These steps can be defined by and/or in one or more computer instructions stored in a computer readable medium, which should be understood to encompass using a memory, a carrier wave or the like to provide the software instructions to a processing device. These steps can be performed by a computer executing the instructions that define the steps. Thus, the terms "routine", "application", "manager", "procedure", and "object" can refer to, for example, a sequence of instructions, a sequence of instructions organized within a programmed-procedure or programmed-function, and/or a sequence of instructions organized within programmed processes executing in one or more computers. Such routines, applications, managers, procedures, objects or the like can also be implemented directly in circuitry that performs the procedure. Further, computer-controlled methods can be performed by a computer executing one or more appropriate programs, by special purpose hardware designed to perform the method, or any combination of such hardware, firmware and software elements.

In operation, the media summarizing system 600 receives a media data stream from the data source 700 over the link 710. The input/output interface 610 inputs the received media data stream, and under the control of the controller 620, forwards it to an input media stream portion 631 of the memory 630 and/or directly to the media stream parameterization circuit, routine or application 640. The media stream parameterization circuit, routine or application 640 then generates feature vectors for each frame of the received media stream. The media stream parameterization circuit, routine or application 640 then stores, under control of the controller 620, the generated feature vectors in a similarity parameter portion 632 of the memory 620 or forwards the generated feature vectors directly to similarity matrix generating circuit, routine or application 650.

The similarity matrix generating circuit, routine or application 650 inputs, under control of the controller 620, feature vectors from the similarity parameter portion 632 of the memory 630 or the media stream parameterization circuit, routine or application 640. Using the generated feature vectors, the similarity matrix generating circuit, routine or application 650 determines a similarity distance for each pair of frames and adds the determined similarity distances into a similarity matrix. The similarity matrix generating circuit, routine or application 650 then stores, under control of the controller 620, the similarity matrix to a similarity matrix portion 633 of the memory 630, or outputs the similarity matrix directly to the similarity matrix factorizing circuit, routine or application 660. It should be appreciated that the similarity matrix generating circuit, routine or application 650 can generate the similarity matrix using any appropriate known or later-developed technique, including the various techniques outlined above.

The similarity matrix factorizing circuit, routine or application 660, inputs, under control of the controller 620, the similarity matrix from the similarity matrix portion 633 of the memory 630, or from the similarity matrix generating circuit, routine or application 640. The similarity matrix factorizing circuit, routine or application 660 generates a basis vector term for each basis vector or significant structure or the media using a probabilistic matrix factorization technique. The similarity matrix factorizing circuit, routine or application 660, under control of the controller 620, stores the basis vector terms in the basis vector term portion 634, of the memory 630, or outputs the basis vector terms directly to the media summary generating circuit, routine or application 670. It should be appreciated that the similarity matrix factorizing circuit, routine or application 660 can factorize the similarity matrix using any appropriate known or later-developed probabilistic matrix factorization technique, including the various techniques outlined above.

The media summary generating circuit, routine or application 670, inputs, under control of the controller 620, the basis vector terms from the basis vector term portion 634 of the memory 630 or from the similarity matrix factorizing circuit, routine or application 660. The media summary generating circuit, routine or application 670 generates a desired media summary from the basis vector term for each basis vector or significant structure or the media, by extracting a representative excerpt from each basis vector, and by combining the extracted excerpts into a summary. The media summary generating circuit, routine or application 660 stores, under control of the controller 620, the media summary in the media summary portion 635 of the memory 630, or outputs the media summary directly to the data sink 800, via the input/output interface 610, and over the link 810. It should be appreciated that the media summary generating circuit, routine or application 670 can generate the media summary using any appropriate known or later-developed technique, including the various techniques outlined above. In particular, the media summary generating circuit, routine or application 670 can use any appropriate known or later developed technique for determining the various representative excerpts, including the various techniques outlined above.

While this invention has been described in conjunction with the exemplary embodiments outlined above, various alternatives, modifications, variations, improvements, and/or substantial equivalents, whether known or that are or may be presently unforeseen, may become apparent. Accordingly, the exemplary embodiments of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or equivalents.

What is claimed is:

1. A method of summarizing a stream of ordered information, comprising:
   generating a similarity matrix for the stream of ordered information;
   decomposing the similarity matrix into a plurality of component matrices using non-negative matrix factorization;
   determining, for each component matrix, a representative portion of the stream of ordered information;
   extracting the determined representative portions; and
   combining the extracted representative portions into a summary of the stream of ordered information.

2. The method of claim 1, wherein the stream of ordered information comprises at least one of at least video information, audio information, still image information, and text information.

3. The method of claim 1, wherein the stream of ordered information comprises a plurality of at least video information, audio information, still image information, and text information.

4. The method of claim 1, wherein generating the similarity matrix for the stream of ordered information comprises:
   windowing the stream of ordered information;
   parameterizing the windowed stream of ordered information; and
   determining the similarity matrix of the parameterized windowed stream of ordered information.

5. The method of claim 4, wherein the stream of ordered information comprises at least audio information, and parameterizing the stream of ordered information comprises parameterizing the stream of ordered audio information based on at least one of a STFT Fourier Transform, a Mel-Frequency Cepstral Coefficients Analysis, a spectrogram, a Fast Fourier Transform and wavelet decomposition.

6. The method of claim 4, wherein the stream of ordered information comprises at least video information, and parameterizing the stream of ordered information comprises parameterizing the stream of ordered video information based on at least one of a histogram, ortho-normal projections, deriving a decimated image from DC coefficients of compression macroblocks and discrete cosine transforms.

7. The method of claim 4, wherein the stream of ordered information comprises at least text information, and parameterizing the stream of ordered information comprises parameterizing the stream of ordered text information based on at least one of a sentence, a paragraph, a meta-data information, a term-frequency inverse-document frequency information and part of speech information.

8. The method of claim 1, further comprising determining a number of the component matrices of the ordered information based on a function.

9. The method of claim 8, wherein determining the number of the component matrices of the ordered information based on a function comprises determining the number of the component matrices of the ordered information based on a probabilistic factorization rank of the similarity matrix for the ordered information.

10. The method of claim 1, wherein decomposing the similarity matrix into the plurality of component matrices using non-negative matrix factorization comprises decomposing a similarity matrix S into a plurality of component matrices $A_k$ using non-negative factorization such that:

$$A_k(i,j) = W(i,k)H(k,j), \text{ and}$$

$$S \cong WH = \sum_{k=1}^{K} A_k,$$

where:
$W(i,k)$ is an N×K matrix;
$H(k,j)$ is a K×N matrix;
N is a number of separable portions of the stream of ordered information;
K is a number of basis vectors; and
k is an integer.

11. The method of claim 10, wherein generating the similarity matrix for the stream of ordered information comprises generating the similarity matrix S such that:

$$L_{NMF} = \sum_{i,j} S(i,j) \log(S_b(i,j)) - S_b(i,j),$$

and $$S \cong S_b = WH;$$

where $S_b$ is a linear approximation of the similarity matrix S.

12. The method of claim 11, wherein generating the similarity matrix for the stream of ordered information further comprises determining a similarity value $S(i,j)$ for each position $(i,j)$ in the similarity matrix S as:

$$S(i,j) = \exp(d_c(v_i, v_j) - 1)$$

where:
$v_i$ and $v_j$ are parameter vectors generated from the stream of ordered information for $i^{th}$ and $j^{th}$ portions of the stream of ordered information; and $d_c$ is the cosine angle between the parameter vectors $v_i$ and $v_j$.

13. A method of summarizing a stream of ordered information, comprising:
generating a similarity matrix for the stream of ordered information;
decomposing the similarity matrix based on a probabilistic matrix factorization into a plurality of component matrices;
determining, for each component matrix, a representative portion of the stream of ordered information;
extracting the determined representative portions; and
combining the extracted representative portions into a summary of the stream of ordered information,
wherein decomposing the similarity matrix based on a probabilistic matrix factorization into the plurality of component matrices comprises decomposing a similarity matrix S into a plurality of component matrices $A_K$ such that:

$$A_K(i,j) = W(i,k)H(k,j), \text{ and}$$

$$S \cong WH = \sum_{k=1}^{K} A_k,$$

where:
$W(i,k)$ is an N×K matrix;
$H(k,j)$ is a K×N matrix;
N is a number of separable portions of the stream of ordered information;
K is a number of basis vectors; and
k is an integer.

14. The method of claim 13, wherein determining, for each component matrix, a representative portion of the stream of ordered information comprises determining, for each component matrix, for each of a plurality of candidate excerpts from a subpart of the stream of ordered information that corresponds to that component matrix, a measure of how representative that candidate excerpt is.

15. The method of claim 14, wherein determining the measure of how representative that candidate excerpt is comprises determining an average within-class matrix $\overline{A}_K(q,r)$ for that candidate excerpt.

16. The method of claim 15, wherein determining the average within-class matrix $\overline{A}_K(q,r)$ for that candidate excerpt comprises determining $\overline{A}_K(q,r)$ as:

$$\overline{A}_k(q,r) = \frac{1}{N(r-q)} \sum_{m=q}^{r} \sum_{n=1}^{N} A_k(m,n);$$

where:
N is a number of separable portions of the corresponding subpart of the stream of ordered information;
r is a ending portion of the excerpt; and
q is an starting portion of the excerpt.

17. The method of claim 16, wherein determining, for the plurality of candidate excerpts from the subpart of the stream of ordered information that corresponds to that component matrix, a measure of how representative that candidate excerpt is comprises determining the average within-class component matrix $\overline{A}_K(q,r)$ for excerpts with all possible starting points r.

18. The method of claim 17, wherein determining, for the plurality of candidate excerpts from the subpart of the stream of ordered information that corresponds to that component matrix, a measure of how representative that candidate excerpt is comprises determining the average within-class component matrix $\overline{A}_K(q,r)$ for excerpts with all possible starting points r, each excerpt having a fixed length L between the starting point r and the ending point q.

19. The method of claim 17, wherein determining, for the plurality of candidate excerpts from the subpart of the stream of ordered information that corresponds to that component matrix, a measure of how representative that candidate excerpt is comprises determining the average within-class component matrix $\overline{A}_K(q,r)$ for excerpts with all possible ending points q.

20. The method of claim 17, wherein determining, for the plurality of candidate excerpts from the subpart of the stream of ordered information that corresponds to that component matrix, a measure of how representative that candidate excerpt is comprises determining the average within-class component matrix $\overline{A}_K(q,r)$ for excerpts having a length $l_K$ for that component k, where the length $l_K$ is determined as:

$$l_k = L_T \frac{\sum_{i,j} A_k(i,j)}{\sum_k \sum_{i,j} A_k(i,j)},$$

where $L_T$ is a total length for the combined excerpts.

21. The method of claim 14, wherein determining the measure of how representative that candidate excerpt is comprises determining, for a given component matrix $A_k$, a score $Q_L^{(k)}(i)$ for the $i^{th}$ starting position of the $k^{th}$ component as:

$$Q_L^{(k)}(i) = \frac{1}{NL} \sum_{m=i}^{i+L} \sum_{n=1}^{N} A_k(m,n),$$

where:
N is a number of separable portions of the corresponding subpart of the stream of ordered information;
i is a starting portion of the excerpt; and
L is a length of the excerpt.

22. The method of claim 21, wherein determining the score $Q_L^{(k)}(i)$ for the $i^{th}$ starting position of the $k^{th}$ component comprises determining a starting point $q_L^{(k)}$ for the excerpt to be extracted from the $k^{th}$ component.

23. The method of claim 22, wherein determining the a starting point $q_L^{(k)}$ for the excerpt to be extracted from the $k^{th}$ component comprises finding the starting point $q_L^{(k)}$ that maximizes the score $Q_L^{(k)}$ for the $k^{th}$ component.

24. A storage medium storing a set of program instructions executable on a data processing device and usable to summarize a stream of ordered information, the set of program instructions comprising:
 instructions for generating a similarity matrix for the stream of ordered information;
 instructions for decomposing the similarity matrix into a plurality of component matrices using non-negative matrix factorization;
 instructions for determining, for each component matrix, a representative portion of the stream of ordered information;
 instructions for extracting the determined representative portions; and
 instructions for combining the extracted representative portions into a summary of the stream of ordered information,
 wherein the storage medium is a computer-readable medium.

25. The storage medium of claim 24, wherein the stream of ordered information comprises at least one of at least video information, audio information, still image information, and text information.

26. The storage medium of claim 24, wherein the stream of ordered information comprises a plurality of at least video information, audio information, still image information, and text information.

27. The storage medium of claim 24, wherein generating the similarity matrix for the stream of ordered information comprises:
 instructions for windowing the stream of ordered information;
 instructions for parameterizing the windowed stream of ordered information; and
 instructions for determining the similarity matrix of the parameterized windowed stream of ordered information.

28. The storage medium of claim 27, wherein the stream of ordered information comprises at least audio information, and the instructions for parameterizing the stream of ordered information comprise instructions for parameterizing the stream of ordered audio information based on at least one of a STFT Fourier Transform, a Mel-Frequency Cepstral Coefficients Analysis, a spectrogram, a Fast Fourier Transform and wavelet decomposition.

29. The storage medium of claim 27, wherein the stream of ordered information comprises at least video information, and the instructions for parameterizing the stream of ordered information comprise instructions for parameterizing the stream of ordered video information based on at least one of a histogram, ortho-normal projections, deriving a decimated image from DC coefficients of compression macroblocks and discrete cosine transforms.

30. The storage medium of claim 27, wherein the stream of ordered information comprises at least text information, and the instructions for parameterizing the stream of ordered information comprise instructions for parameterizing the stream of ordered text information based on at least one of a sentence, a paragraph, a meta-data information, a term-frequency inverse-document frequency information and part of speech information.

31. The storage medium of claim 24, further comprising determining a number of the component matrices of the ordered information based on a function.

32. The storage medium of claim 31, wherein the instructions for determining the number of the component matrices of the ordered information based on a function comprise instructions for determining the number of the component matrices of the ordered information based on a probabilistic factorization rank of the similarity matrix for the ordered information.

33. The storage medium of claim 24, wherein the instructions for decomposing the similarity matrix into the plurality of component matrices comprise instructions for decomposing a similarity matrix S into a plurality of component matrices $A_k$ such that:

$$A_k(i,j) = W(i,k)H(k,j), \text{ and}$$

$$S \cong WH = \sum_{k=1}^{K} A_k,$$

where:
W(i,k) is an N×K matrix;
H(k,j) is a K×N matrix;
N is a number of separable portions of the stream of ordered information;

K is a number of basis vectors; and k is an integer.

34. The storage medium of claim 33, wherein the instructions for determining, for each component matrix, a representative portion of the stream of ordered information comprise instructions for determining, for each component matrix, for each of a plurality of candidate excerpts from a subpart of the stream of ordered information that corresponds to that component matrix, a measure of how representative that candidate excerpt is.

35. The storage medium of claim 34, wherein the instructions for determining the measure of how representative that candidate excerpt is comprise instructions for determining, for a given component matrix $A_k$, a score $Q_L^{(k)}(i)$ for the $i^{th}$ starting position of the $k^{th}$ component as:

$$Q_L^{(k)}(i) = \frac{1}{NL}\sum_{m=i}^{i+L}\sum_{n=i}^{N} A_k(m,n),$$

where:

N is a number of separable portions of the corresponding subpart of the stream of ordered information;

i is a starting portion of the excerpt; and

L is a length of the excerpt.

36. The storage medium of claim 35, wherein the instructions for determining the score $Q_L^{(k)}(i)$ for the $i^{th}$ starting position of the $k^{th}$ component comprise instructions for determining a starting point $q_L^{(k)}$ for the excerpt to be extracted from the $k^{th}$ component.

37. The storage medium of claim 36, wherein the instructions for determining the a starting point $q_L^{(k)}$ for the excerpt to be extracted from the $k^{th}$ component comprise instructions for finding the starting point $q_L^{(k)}$ that maximizes the score $Q^{L(k)}$ for the $k^{th}$ component.

38. The storage medium of claim 34, wherein the instructions for determining the measure of how representative that candidate excerpt is comprise instructions for determining an average within-class matrix $\overline{A}_K(q,r)$ for that candidate excerpt.

39. The storage medium of claim 38, wherein the instructions for determining the average within-class matrix $\overline{A}_K(q,r)$ for that candidate excerpt comprise instructions for determining $\overline{A}_K(q,r)$ as:

$$A_k(q,r) = \frac{1}{N(r-q)}\sum_{m=q}^{r}\sum_{n=1}^{N} A_k(m,n);$$

where:

N is a number of separable portions of the corresponding subpart of the stream of ordered information;

r is a ending portion of the excerpt; and q is an starting portion of the excerpt.

40. The storage medium of claim 39, wherein the instructions for determining, for the plurality of candidate excerpts from the subpart of the stream of ordered information that corresponds to that component matrix, a measure of how representative that candidate excerpt is comprise instructions for determining the average within-class component matrix $\overline{A}_K(q,r)$ for excerpts with all possible starting points r.

41. The storage medium of claim 40, wherein the instructions for determining, for the plurality of candidate excerpts from the subpart of the stream of ordered information that corresponds to that component matrix, a measure of how representative that candidate excerpt is comprise instructions for determining the average within-class component matrix $\overline{A}_K(q,r)$ for excerpts having a length $l_k$ for that component k, where the length $l_k$ is determined as:

$$l_k = L_T \frac{\sum_{i,j} A_k(i,j)}{\sum_k \sum_{i,j} A_k(i,j)},$$

where $L_T$ is a total length for the combined excerpts.

42. The storage medium of claim 40, wherein the instructions for determining, for the plurality of candidate excerpts from the subpart of the stream of ordered information that corresponds to that component matrix, a measure of how representative that candidate excerpt is comprise instructions for determining the average within-class component matrix $\overline{A}_K(q,r)$ for excerpts with all possible starting points r, each excerpt having a fixed length L between the starting point r and the ending point q.

43. The storage medium of claim 42, wherein the instructions for determining, for the plurality of candidate excerpts from the subpart of the stream of ordered information that corresponds to that component matrix, a measure of how representative that candidate excerpt is comprise instructions for determining the average within-class component matrix $\overline{A}_K(q,r)$ for excerpts with all possible ending points q.

44. The storage medium of claim 24, wherein the instructions for decomposing the similarity matrix into the plurality of component matrices using non-negative matrix factorization comprise instructions for decomposing a similarity matrix S into a plurality of component matrices $A_k$ using non-negative factorization such that:

$$A_k(i,j) = W(i,k)H(k,j), \text{ and}$$

$$S \cong WH = \sum_{k=1}^{K} A_k,$$

where:

W(i,k) is an N×K matrix;

H(k,j) is a K×N matrix;

N is a number of separable portions of the stream of ordered information;

K is a number of basis vectors; and k is an integer.

45. The storage medium of claim 44, wherein the instructions for generating the similarity matrix for the stream of ordered information comprise instructions for generating the similarity matrix S such that:

$$L_{NMF} = \sum_{i,j} S(i,j)\log(S_b(i,j)) - S_b(i,j),$$

$$S \cong S_b = WH$$

where $S_b$ is a linear approximation of the similarity matrix S.

46. The storage medium of claim 45, wherein the instructions for generating the similarity matrix for the stream of ordered information further comprise instructions for determining a similarity value S(i,j) for each position (i,j) in the similarity matrix S as:

$$S(i,j) = \exp(d_c(v_i,v_j)) - 1.$$

where:

$v_i$ and $v_j$ are parameter vectors generated from the stream of ordered information for $i^{th}$ and $j^{th}$ portions of the stream of ordered information; and $d_c$ is the cosine angle between the parameter vectors $v_i$ and $v_j$.

47. A stream of ordered information summarizing system, comprising
- a similarity matrix determining circuit, routine or application that determines a similarity between two portions of the stream of ordered information and that stores the determined similarity into a similarity matrix;
- a probabilistic decomposition circuit, routine or application that decomposes the similarity matrix into a plurality of component matrices using non-negative matrix factorization;
- an excerpt determining circuit, routine or application that determines, for each component matrix, a representative portion of the stream of ordered information;
- an excerpt extracting circuit, routine or application that extracts the determined representative portions; and
- a summary generating circuit, routine or application that combines the extracted representative portions into a summary of the stream of ordered information.

48. The stream of ordered information summarizing system of claim 47, further comprising:
- a windowing circuit, routine or application that windows the stream of ordered information; and
- a parameterization circuit, routine or application that parameterizes the windowed stream of ordered information;
- wherein the similarity matrix determining circuit, routine or application that determines the similarity between two portions of the windowed and parameterized stream of ordered information.

* * * * *